Oct. 28, 1958     E. G. LE MAY, JR., ET AL     2,858,075
AIR CONDITIONING CONTROL SYSTEM
Filed Jan. 20, 1954     2 Sheets-Sheet 2

INVENTORS.
ERNEST G. LE MAY, JR.
JOHN E. DRAKE

United States Patent Office 2,858,075
Patented Oct. 28, 1958

2,858,075
AIR CONDITIONING CONTROL SYSTEM

Ernest G. Le May, Jr., and John E. Drake, Northport, N. Y., assignors to Fairchild Engine and Airplane Corporation, Bay Shore, N. Y., a corporation of Maryland Application January 20, 1954, Serial No. 405,075

24 Claims. (Cl. 236—13)

The present invention relates to air conditioning control systems and, more particularly, to novel and improved air conditioning control systems for use under conditions of extreme variations in air supply, and ambient temperature and pressure.

It has been found desirable in present day aircraft, especially aircraft powered by jet engines or other similar types of power plants, to utilize the compressors of the engines as a source of supply of the air for the air conditioning system of the aircraft. The use of such a source requires extremely accurate and effective controls because of the wide ranges of temperatures and pressures of the air supply from the compressor and also the wide ranges of temperatures and pressures of the ambient air generally used in heat exhcangers in such systems. For example, air from jet engine compressors may range in temperatures from 770° F. to 360° F., as it is delivered to the system, and may vary from 210 p. s. i. g. to 15 p. s. i. g. The ambient air available for the heat exchangers may vary from 135° F. to minus 75° F. and may vary from 14.7 p. s. i. a. to 2 p. s. i. a. Further, it has been found in practice that the temperature of the air leaving the heat exchanger may vary from 170° F. to minus 60° F.

In accordance with the invention, an aircraft air conditioning system is provided which will operate within the above-stated ranges and deliver to the cabin of the aircraft, or any other desired location, a constant volume of air (within plus or minus 7%) at a temperature of 35° F. (plus or minus 2°). In order to achieve the specified results, the system may comprise a combination of a source of air which is delivered through a primary control valve, controlled by a volume sensor, to a heat exchanger and thence to the desired location, for example a pressurized cabin, through a cooling means, such as a conventional expansion turbine, and/or a bypass channel controlled by a secondary control valve. The proportional amount of air by-passed around the cooling means determines the temperature of the air as it enters the desired location and also the volume flow of air to the location.

The secondary control valve is operated by the application of pressure upon a diaphragm connected to a valve disc in the secondary valve, which is located in the bypass channel. The higher the pressure applied to the diaphragm, the more the valve is closed. The amount of pressure upon the diaphragm controlling the secondary control valve is controlled either by a temperature sensitive controller or by a secondary flow controller sensitive to volume flow.

The temperature sensitive controller and the secondary flow controller develop the control pressures applied to the diaphragm of the secondary control valve on a proportional basis. For example, a control pressure $Pc$ is developed by selecting a fluid pressure signal, preferably from a particular location in the system, and then modifying this signal. More particularly, a fluid pressure signal $Ps$ may be taken from a predetermined location in the system and fed through a restriction into a conduit or chamber in which the control pressure $Pc$ is developed. Another restriction may lead from this conduit or chamber into another part of the system or to the atmosphere and serve to bleed or exhaust the fluid pressure signal $Ps$. Thus the pressure in the control pressure conduit or chamber may be varied from substantially zero, when the bleed or exhaust restriction is completely open, to a value equal to $Ps$, when the bleed or exhaust restriction is completely closed.

If the input restriction for the fluid pressure signal $Ps$ is fixed, the control pressure $Pc$ may be varied by varying the area of the opening in the bleed or exhaust restriction. This variation of the bleed area of the restriction may be a function of some particular characteristic of the system. If the input restriction for the fluid pressure signal $Ps$ is variable, the control pressure $Pc$ may be varied by controlling the proportionality of the area of the openings in the input restriction and the bleed or exhaust restriction, as a function of some particular characteristic of the system. The secondary control valve is operated by variations in the control pressure $Pc$ until the system returns to a condition of stability.

A system of this type suffers from an inherent defect, in that, after rapid or large variations occur in the operating conditions of the system, the particular point of stability at which the system settles may be different from the point of stability at which the system was operating prior to the variation. Therefore, it is evident that such a system will not operate satisfactorily within extremely rigid operating specifications, such as required by some aircraft.

In order to improve the accuracy of the system, the control pressure $Pc$ is regulated by a device hereinafter known as a reset controller. The reset controller modifies the control pressure $Pc$ in such a manner as to reset the control system to a predetermined point of stability. Thus providing a substantially zero error.

An air conditioning control system may have one or both of two desirable attributes, i. e. the ability to maintain the temperature of the air supplied to the location that is being air conditioned at a substantially constant value and the ability to maintain the volume flow of air to that location at a substantially constant value.

Let us first consider the requirement that the temperature be maintained substantially constant. Since the secondary control valve controls the proportional amount of air by-passed around the cooling means, the control pressure $Pc$ must be responsive to variations in the temperature of the downstream flow of air to the location to be air conditioned. This is accomplished by means of a temperature sensor positioned in the downstream flow.

The temperature sensor controls the size of a variable bleed restriction opening into the downstream flow, as a function of the temperature of that flow. This variable restriction is positioned in a first conduit or pipe leading to the secondary control valve. Another conduit leads to a point in the first conduit between the variable restriction and the secondary control valve from a location preferably upstream of the primary control valve. The second conduit has a fixed restriction therein. Thus the pressure $Pc$ in the conduit leading to the secondary control valve is varied as a function of the temperature of the fluid being delivered to the air conditioned location. The reset controller regulates the pressure of the fluid flow to the fixed restriction so as to maintain the ratio of the regulated pressure $Pr$ to the control pressure $Pc$ equal to a constant, thereby resetting the system to a zero error after any change or variation.

The secondary flow controller functions in a somewhat similar manner to maintain the volume flow of air substantially constant by controlling the secondary valve, More particularly, the aforementioned fluid pressure $P_r$, regulated by the reset controller, is fed to a variable restriction instead of the fixed restriction associated with the temperature responsive system. This variable restriction feeds into a chamber in the secondary flow controller. Another variable restriction references the chamber of the secondary flow controller to the atmosphere or some point of the system, e. g. preferably the downstream flow into the air conditioned location. A volume flow sensor controls the proportional flow through the two variable restrictions and the resultant pressure $P_c$ in the chamber of the secondary flow controller is conducted to the secondary control valve. Thus the control pressure $P_c$ adjusts the secondary control valve to control the volume flow through the system and the reset controller cooperates with the secondary flow controller to maintain the volume flow through the system substantially constant.

A primary flow controller functions in a similar manner to the secondary flow controller to control the volume flow of fluid through the system by means of the primary control valve. However, the primary flow controller is not in cooperative relation with the reset controller.

In practice, it is generally found that it is desirable to operate the temperature sensitive controller and the secondary flow controller at different times under different operating conditions. Accordingly, a selector valve is provided to select the control pressure $P_c$ from either the temperature sensitive controller or the secondary flow controller. The control pressure selected by the selector valve is fed both to the reset controller and to a load chamber in the reset controller.

A by-pass pipe with a manually or thermostat operated valve means therein, may also be provided to deliver air around the heat exchanger and the cooler directly to the location to be air conditioned from the down stream side of the primary valve. Manually or solenoid operated conventional pipe restrictions may also be placed in the system for positive control by the operator of the system.

For a more complete understanding of the invention, reference should be made to the following detailed description taken in conjunction with the accompanying figures of the drawing, in which.

Figure 1:
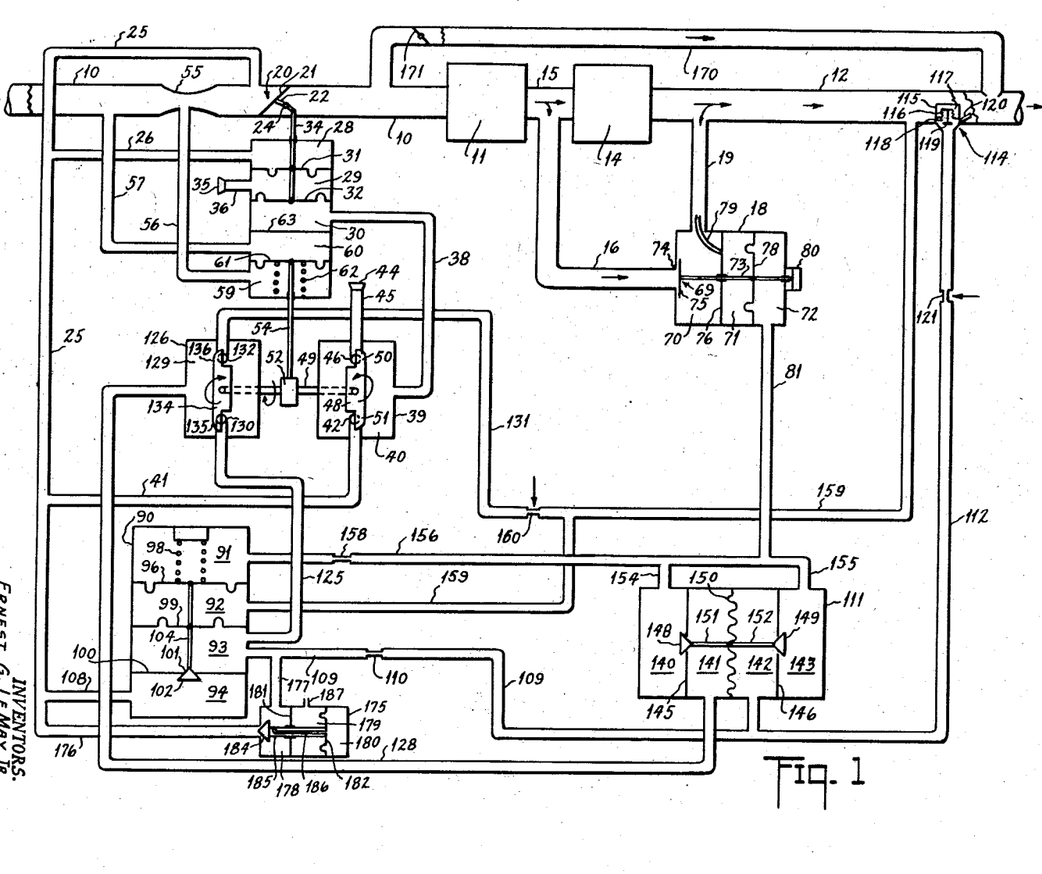
Figure 1 is a schematic diagram of one embodiment of an air conditioning control system, in accordance with the invention.

Referring to Fig. 1, an air conditioning control system, in accordance with the invention, may comprise an intake pipe or conduit 10 leading from an air supply source (not shown), which may, for example, be the compressor of a jet engine. The intake pipe 10 may be directly connected to a heat exchanger 11 which may be any suitable type of conventional heat exchanger. The heat exchanger 11 may be connected through two parallel paths or channels to an output pipe 12, which leads to the location (not shown) which is to be air conditioned, for example, a pressurized cabin for an aircraft.

One of the parallel channels connecting the heat exchanger 11 to the output pipe 12 may include a cooler 14 connected to the heat exchanger 11 by a coupling pipe 15 and having an output connected to the output pipe 12. The cooler 14 may be of any suitable type, for example, a conventional expansion turbine. The other parallel channel leading from the heat exchanger 11 to the output pipe 12 may include a by-pass pipe 16 leading from the coupling pipe 15 to a secondary control valve 18, which in turn may be connected through a pipe 19 to the output pipe 12.

A primary control valve 20 may be positioned in the intake pipe 10 leading to the heat exchanger 11. The primary control valve 20 may include a valve disc 21 and a valve stem 22, which may be pivoted at a point 24 located centrally within the bore of the intake pipe 10. A lead-off pipe 25 may be connected to the intake pipe 10 at a position upstream of the primary control valve 20. A branch pipe 26 may connect the lead-off pipe 25 to a chamber 28 of a mechanism for controlling the movement of the primary control valve 20.

The control mechanism for the primary control valve 20 may further include chambers 29 and 30. The chambers 28, 29 and 30 may be arranged in tandem, with a flexible diaphragm 31 separating the chambers 28 and 29 and a flexible diaphragm 32 separating the chambers 29 and 30. The effective areas of the diaphragms 31 and 32 may be different, with the diaphragm 32 preferably twice the effective area of the diaphragm 31. A rod 34 may be fixedly connected to both of the diaphragms 31 and 32 and to the valve stem 22 of the primary control valve 20, so that the movement of the primary control valve 20 is directly controlled by the movement of the diaphragms 31 and 32.

The chamber 29 may be connected with the atmosphere at a point 35 by a vent pipe 36. The chamber 30 may be connected by a pipe 38 to a primary flow controller and amplifier 39 having a chamber 40 therein. A branch pipe 41 having an orifice 42 within the chamber 40 may connect the lead-off pipe 25 to the chamber 40. The chamber 40 may also be connected to the atmosphere at a point 44 by an exhaust pipe 45 having an orifice 46 within the chamber 40 of the primary flow controller and amplifier 39.

A valve plate 48 may be mounted on a shaft 49 within the chamber 40 in such a manner as to have its ends 50 and 51 movably positioned in registry with the orifices 46 and 42, respectively, thereby forming variable restrictions. One-half of each of the ends 50 and 51 of the plate 48 may be cut away so that when one end of the valve plate 48 is in registry with one of the orifices 42 or 46 thereby closing that particular orifice, the other end of the valve plate 48 will be out of registry with the other one of the orifices 42 and 46 thereby permitting the flow of air through the latter orifice. For example, when the end 50 of the valve plate 48 is in registry, i. e., covering, the orifice 46, the other end 51 of the valve plate 48 is out of registry with the orifice 42, thereby leaving the orifice 42 uncovered. Further, the cut away portions of the valve plate ends 50 and 51 preferably may be positioned so that, when one end moves out of registry with its associated orifice to open the restriction formed thereby, the other end moves into registry with its associated orifice to close the restriction formed thereby. Thus the orifice 42 and the end 51 of the valve plate 48 form a variable inlet restriction and the orifice 46 and the end 50 of the valve plate 48 form a variable bleeder restriction.

The shaft 49 upon which the valve plate 48 is mounted may pass through the wall of the primary flow controller 39 and may be rotatably mounted in a conventional rack and pinion gear mechanism 52, wherein the rotation of the shaft 49 may be controlled by the longitudinal movement of a rod 54 connected to the rack of the rack and pinion gear mechanism 52.

A flow sensor may be positioned in the intake pipe 10 at a point preferably upstream of the primary control valve 20 and the lead-off pipe 25. The flow sensor may include a Venturi tube section 55 in the intake tube 10, a lead-off pipe 56 from the Venturi tube section 55 and a lead-off pipe 57 connected to the intake pipe 10, preferably at a point upstream from the Venturi tube section 55. The lead-off pipes 56 and 57 may be connected to the chambers 59 and 60, respectively, which form a flow comparator. The chambers 59 and 60 may be separated by a flexible diaphragm 61 which may be spring loaded by a spring 62. The rod 54 may be fixedly connected to the diaphragm 61, so that the shaft 49 may be rotated by means of the rack and pinion gear mechanism in response to the movement of the diaphragm 61.

The chamber 60 may be positioned adjacent the chamber 30 and be separated therefrom by a rigid wall 63.

The secondary control valve 18 may comprise a poppet valve 69 mounted in three separate chambers 70, 71 and 72. The by-pass pipe 16 may open into the chamber 70 so as to form a valve seat 74, upon which the valve disc 75 of the poppet valve 69 may close in order to stop the flow of air from the by-pass pipe 16 into the chamber 70. The chambers 70 and 71 may be separated by a rigid diaphragm 76, whereas the chambers 71 and 72 may be separated by a flexible diaphragm 78. The valve stem 73 of the poppet valve 69 may be fixedly connected to the flexible diaphragm 78 and may slidably pass through the rigid diaphragm 76, so that the movement of the poppet valve 69 may be directly controlled by the movement of the flexible diaphragm 78.

The pipe 19 may open into the chamber 70 of the secondary control valve 18 and serve as an outlet from the chamber 70 into the output pipe 12. A small bore pipe 79 may be connected to the chamber 71 and have an orifice feeding into the downstream flow from the by-pass pipe 16. Aerodynamic damping thus may be achieved as a function of the open position of the valve 69 by allowing the volume in the chamber 71 to vent through the restrictive pipe 79 into the static pressure space downstream the valve disc 75. It will be seen that the damping effect of the arrangement is much greater as the disc 75 approaches the seat 74 than when the valve is in a more open position.

The end of the valve stem 73 of the poppet valve 69 opposite to the valve disc 75 may be connected to a suitable damping means, for example a dash pot 80, so as to provide high frequency stabilization of the secondary control valve 18. Since the system is operated over a very wide range of temperatures, it is necessary to use a special type of damper fluid which will maintain a proper value of viscosity over the temperature range, for example, a conventional silicone damping fluid.

A pipe 81 may be connected to the operating chamber 72 so that pressure may be applied within the chamber 72 to control the movement of the diaphragm 78, thereby controlling the movement of the poppet valve 69.

A reset controller or regulator 90 may be included in the air conditioning control system of Fig. 1. The reset controller 90 may include a series of four chambers, 91, 92, 93 and 94, which may be designated as a load chamber 91, a reference chamber 92, an output chamber 93 and an input chamber 94. The load chamber 91 may be separated from the reference chamber 92 by a flexible diaphragm 96, which may be spring loaded by a spring 98. The reference chamber 92 may also be separated from the output chamber 93 by a flexible diaphragm 99. The ratio of the flexible areas of the diaphragm 96 to that of the flexible diaphragm 99 preferably has a specific value, for example, 1.0 to 0.7.

The chamber 93 may also, in turn, be separated from the inlet chamber 94 by a stiff diaphragm 100 having an aperture 101 centered therein to form a valve seat for a poppet valve 102. The valve stem 104 of the poppet valve 102 may be fixedly connected to the flexible diaphragms 96 and 99.

The input chamber 94 may be connected to the lead-off pipe 25 by a branch pipe 108. The output chamber 93 may be connected to the operating chamber 72 of the secondary control valve 18 by means of a pipe 109 having a conventional fixed restriction 110 positioned therein, a selector valve 111 and the pipe 81. The pipe 109 may also be connected by a pipe 112 to a temperature sensor 114 positioned in the output pipe 12 and controlling a variable bleeder restriction leading into the downstream flow through the output pipe 12 to the location to be air conditioned.

The temperature sensor 114 may comprise a casing 115 positioned within the output pipe 12 and having a bellows type diaphragm 116 dividing the casing into a closed upper chamber 117, which may contain a suitable temperature responsive fluid, and a lower chamber 118. The lower chamber 118 may open into the pipe 112. A poppet valve 119 may be disposed within the lower chamber 118 with its stem connected to the bellows type diaphragm 116 in such a manner that, when the fluid in the upper chamber 117 expands with an increase in temperature, the poppet valve 119 tends to close the opening into the pipe 112. A small bore outlet pipe 120 may extend from the lower chamber 118 into the downstream flow of the output pipe 12. Thus the poppet valve 119 and the opening into the pipe 112 comprise a variable bleeder restriction.

The temperature sensor 114 permits air to bleed from the pipe 112 inversely in proportion to the temperature of the air being delivered to the cabin, that is, the higher the temperature of the air in the pipe 12 the more closed the sensor 114 becomes and the less the air is bled from the pipe 112.

The pipe 112 may have a conventional variable restriction 121 positioned therein intermediate the temperature sensor 114 and the pipe 109.

The output chamber 93 of the reset controller 90 may also be connected to the operating chamber 72 of the secondary control valve 18 by means of a pipe 125, a secondary flow controller 126, a pipe 128, the selector valve 111 and the pipe 81.

The secondary flow controller 126 may be constructed in a manner similar to the primary flow controller and amplifier 39. More particularly, the secondary flow controller 126 may include a chamber 129 into which the pipe 125 opens through an orifice 130. Another pipe 131 connected to some suitable location in the system or to the atmosphere may open into the chamber 129 through an orifice 132. The rotating shaft 49 may penetrate the wall of the chamber 129 and may have a valve plate 134, of a similar configuration to the valve plate 48 of the primary flow controller and amplifier 39, mounted thereon. The orifice 130 and the lower end 135 of the valve plate 134 form an inlet variable restriction for fluid flow from the output chamber 93 of the reset controller 90, and the orifice 132 and the upper end 136 of the valve plate 134 form a variable bleeder restriction.

The valve plate 134 may be angularly displaced with respect to the valve plate 48 on the shaft 49 so that when the upper orifice 46 of the exhaust pipe 45 in the primary flow controller 39 is uncovered the lower orifice 130 in the secondary flow controller 126 is also uncovered, and, similarly, the lower orifice 42 of the primary flow controller 39 is covered at the same time that the upper orifice 132 of the secondary flow controller 126 is covered.

The pipe 128 serves to connect the chamber 129 of the secondary flow controller 126 to the selector valve 111.

The selector valve 111 may comprise four chambers 140, 141, 142 and 143, in series. The two outer chambers 140 and 143 may be separated from the two inner chambers 141 and 142 by rigid diaphragms 145 and 146, respectively. Poppet valves 148 and 149 may be mounted in the rigid diaphragms 145 and 146, respectively. The inner chambers 141 and 142 may be separated by a flexible diaphragm 150 having the valve stems 151 and 152 of the poppet valves 148 and 149, respectively, connected thereto, so that the movement of the flexible diaphragm 150 tends to close one of the poppet valves 148 and 149, while at the same time tending to open the other of the poppet valves. The outer chambers 140 and 143 may be connected to the pipe 81 leading to the operating chamber 72 of the secondary control valve 18 through pipes 154 and 155, respectively.

The load chamber 91 of the reset controller 90 may also be connected to the pipe 81 by means of a pipe 156 having a very small fixed restriction 158 therein.

The reference chamber 92 of the reset controller 90 may be connected to any suitable reference location, for example, to the output pipe 12 at a point near to the location to be air conditioned by means of a pipe 159. The pipe 131 leading from the secondary flow controller 126 may be connected to the pipe 159 and may have a conventional variable restriction 160 mounted therein at a position between the junction of the pipe 131 with the pipe 159 and the orifice 132 of the pipe 131 within the secondary flow controller 126.

The variable restrictions 121 and 160 may take the form of any suitable type of conventional variable restriction, for example, manually operated or solenoid operated variable restrictions under the control of the personnel in the aircraft.

A by-pass pipe 170 may be connected to the intake pipe 10 at a point slightly upstream of the heat exchanger 11 and may be connected at its other end to the output pipe 12 at a point close to the cabin, or other location that is to be air conditioned. A control valve 171, may be positioned in the pipe 170 to control the by-pass of air from the intake pipe 10 to the outlet pipe 12.

A start-up valve assembly 175 may be bridged across the reset controller 90 by means of a pipe 176, connecting the input to the start-up valve assembly 175 to the lead-off pipe 25, and a pipe 177, connecting the output of the start-up valve assembly 175 to the pipe 109 at a point preferably upstream of the fixed restriction 110. The start-up valve assembly 175 may consist of three chambers 178, 179 and 180, wherein the chambers 178 and 179 may be separated by a rigid partition 181 and the chambers 179 and 180 may be separated by a flexible diaphragm 182. A poppet valve 184 may be positioned in the chamber 178 to close into the upstream flow from the pipe 176 into the chamber 178 upon a valve seat formed by the opening of the pipe 176 into the chamber 178.

A valve stem 185 for controlling the poppet valve 184 may pass through a conventional fluid seal in the rigid partition 181 and be connected to the flexible diaphragm 182, so that the movement of the diaphragm 182 controls the volume flow of fluid from the pipe 176 into the chamber 178 and then through the pipe 177 into the pipe 109. The valve stem 185 may contain a passageway 186 leading from the chamber 180 to the chamber 178. The chamber 179 may be vented to the atmosphere by a vent 187.

The effective area of the flexible diaphragm 182 may be designed to be a predetermined multiple of the effective area of the poppet valve 184, e. g. preferably twice the effective area of the valve 184.

Let us now discuss the operation of the air conditioning control system of Fig. 1. When the system is not in use, there is no pressure other than the ambient pressure in the intake pipe 10. Therefore, the spring 62 biases the flexible diaphragm 61 of the volume sensor to its full upward position, thereby positioning the valve plates 48 and 134 of the primary flow controller and amplifier 39 and the secondary flow controller 126, respectively, so that the orifice 46 of the exhaust pipe 45 is completely uncovered and the orifice 42 of the branch pipe 41 is completely covered in the primary flow controller 39. Further the orifice 130 of the pipe 125 is completely covered in the secondary flow controller 126.

The spring 98 in the load chamber 91 of the reset controller 90 biases the poppet valve 102 to an open position permitting the flow of air from the inlet chamber 94 to the output chamber 93 of the reset controller 90. Since there is no pressure other than the ambient pressure in the chamber 72 of the secondary control valve 18, the poppet valve 69 may be either in an open or closed position. The primary control valve 20 may also be in either an open or closed position at the start of operation. The temperature sensor 114 is either open to some extent or closed, according to the temperature of the stagnant air in the output pipe 12. The start-up valve assembly 175 may be either in an open or closed position. The variable restrictions 121 and 160 are open. The manually controlled valve 171 in the by-pass pipe 170 is closed.

When the air is first supplied under pressure to the intake pipe 10, the air flows past the disc 21 of the primary control valve 20 through the pipe 10 to the heat exchanger 11 and then through the cooler 14 to the output pipe 12 leading to the cabin. If the control valve 20 is completely closed when the air is first supplied, air from the intake pipe 10 would flow through the pipe 25 to the chamber 28 causing the control valve 20 to be at least partially opened by the pressure build up in chamber 28. The airflow from the heat exchanger 11 also passes through the by-pass pipe 16, the secondary control valve 18 and the pipe 19 to the output pipe 12. If the valve disc 75 of the poppet valve 69 in the secondary control valve 18 is not wide open with relation to the valve seat 74, it is moved at once to that position by the pressure of the air flowing against it.

Figure 2:
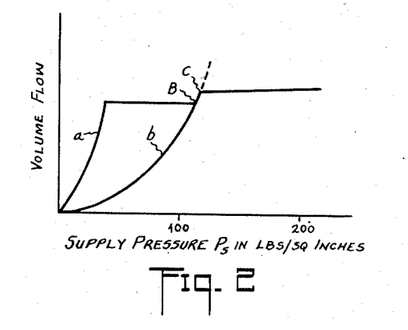
Figure 2 is a graph showing the relation of the volume of air flow in the system of Fig. 1 to the pressure of the air supply when the secondary or by-pass valve of the system is wide open.

In Fig. 2, there is shown a curve (a) representing the volume flow for increasing values of supply pressure $P_s$. As the resistance to the flow of air through the cooler 14 is much higher than that through the secondary control valve 18, only a small volume of the air through the heat exchanger 11 will flow through the cooler 14 until the pressure in the pipe 15 has risen to an appreciable value. The relation of the flow of air to the supply pressure through the cooler 14 is shown in the curve (b) of Fig. 2.

As the pressure is built up in the pipe 10, the air flows through the lead-off pipe 25 and the branch pipe 108 to the input chamber 94 of the reset controller 90. Since the poppet valve 102 is open under the effect of the spring 98, the air from the lead-off pipe 25 flows from the input chamber 94 into the output chamber 93, through the pipe 109 and the restriction 110 to the inner chamber 142 of the selector valve 111. The air flowing through the pipe 109 is retarded by the restriction 110 and by the poppet valve 102 of the reset controller. At the same time, air flows from the output chamber 93 through the pipe 125, the secondary flow controller 126 and the pipe 128 to the inner chamber 141 of the selector valve 111. It will be obvious that inherent delays are also present in this latter flow path.

The diaphragm 150 of the selector valve 111 is moved in a direction away from one or the other of the inner chambers 141 or 142, according to which of the chambers is subjected to the higher pressure. Thus the valve stems 151 and 152 open either of the valves 148 or 149 to permit the lower of the pressures in the pipes 109 and 128 to pass through one of the outer chambers, 140 or 143, into their respective pipes 154 or 155 and thence through the pipe 81 to the operating chamber 72 of the secondary control valve 18.

Air from one or the other of the pipes 154 or 155 also flows through the pipe 156 to the load chamber 91 of the reset controller 90. As a result of the very small restriction 158, hereinafter known as the reset restriction, in the pipe 156, a substantial time delay is present in the build up of pressure in the load chamber 91. This time delay is a function of the cross section area of the fixed restriction 158 and the volumetric capacity of the load chamber 91. It has been found in practice, that the initial application of supply pressure through the lead-off pipe 25 to the reset regulator 90 produces only 1.5–2.0 p. s. i. g. regulated pressure Pr in the output of the regulator 90, as determined by the setting of the bias spring 98. This pressure operates to change the load chamber 91 through the reset restriction 158 and eventually control the position of the poppet valve 102 to increase the regulated pressure $Pr$ to usable values. However, as a result of the large cumulative time delay present in the control system, the time required may be 3 to 15 minutes. Such a time delay cannot be tolerated in some applications of the control system.

The start-up valve assembly 175 effectively reduces this delay. Immediately upon the application of supply pressure $P_s$ through the pipe 176 connected to the lead-off 25, the poppet valve 184 opens and permits fluid flow into the chamber 178 and through the pipe 177 to the pipe 109. Since the chamber 178 is connected to the chamber 180 by means of the passageway 186, the pressure in the chamber 180 is always substantially the same as the output pressure of the start-up valve assembly 175, which is equivalent to the regulated pressure $Pr$. Since the effective area of the flexible diaphragm 182, which is subjected to the pressure $Pr$ in the chamber 180, is twice the effective area of the poppet valve 184, which is subjected to the supply pressure $P_s$, it will be apparent that the regulated pressure $Pr$ is held to ½ the supply pressure $P_s$, until the reset regulator 90 comes into effective action. Thus it is apparent that the start-up valve assembly 175 substantially increases the regulated pressure $Pr$ at the initial stages of operation and that this increase in regulated pressure hastens the build up of the pressure in the load chamber 91. Further, the increase in initial regulated pressure $Pr$ provides some working control pressures $Pc$ for the secondary control valve 18 at an earlier stage.

As the pressure rises in the pipes 109 and 128, and one or the other of these pressures is passed on into the pipes 156 and 81, the poppet valve 69 of the secondary control valve 18 starts to close under the action of the diaphragm 78 until the valve 69 is completely closed and all of the circulating air in the system passes through the cooler 14, as shown at point B on curve (b) of Fig. 2. With any further increase in the supply pressure, the curve (b) would tend to follow the dotted section of the curve. However, the primary control valve 20 assumes control of the system at the point C and the volume flow remains substantially constant with any further increase in supply pressure.

This constant flow value is maintained by the venturi tube section 55, causing a differential pressure in the fluid in the lead-off pipes 56 and 57 which is applied to the diaphragm 61, thereby forcing the rod 54 downward. This downward movement of the rod 54 operates the shaft 49 to turn the valve plate 48 of the primary flow controller 39, mounted thereon, so as to start to uncover the orifice 42 of the branch pipe 41 and to cover or close the orifice 46 of the exhaust or bleed pipe 45. Thus the pressure rises in the chamber 40 of the primary flow controller 39.

The pressure that is built up within the chamber 40 is delivered to the chamber 30 and the lower side of the flexible diaphragm 32. Since the area of the flexible portion of the diaphragm 32 is twice that of the flexible portion of the diaphragm 31, which is already subjected to the supply pressure through the lead-off pipe 25, the rod 34 moves upward to close the valve disc 21 of the primary control valve 20.

Since the chamber 29, between the diaphragms 31 and 32, is open to the atmosphere through the vent pipe 36, it serves to relieve the back pressure on the diaphragms 31 and 32, that is, on the underside of the diaphragm 31 and the upper side of the diaphragm 32, and also to apply a differential force to the rod 34 in proportion to the relative areas of the diaphragms and in proportion to the ambient absolute pressure. As higher altitudes are reached the net or effective differential force on the rod 34 decreases. For the same pressure in the pipe 38, therefore, the tendency for the rod 34 to move upward becomes greater and the primary control valve 20 is kept wider open for the higher altitudes at which the aircraft may be flying.

As the supply pressure $P_s$ reaches normal operating conditions, the regulated pressure $Pr$ tends to become stable, the volume flow is substantially constant, and the temperature of the air delivered from the output pipe 12 is maintained at a predetermined value, as will be explained below. When the aircraft leaves the ground and gains altitude, the ambient pressure and the supply pressure $P_s$ drop in value. However, while the aircraft is flying at low and medium altitudes, the primary flow controller 39 and the primary control valve 20 are able to satisfactorily maintain a substantially constant predetermined volume flow of air to the location being air conditioned, for example a pressurized cabin. Since the volume flow of air is substantially constant into the pressurized cabin, the pressure within the cabin is maintained constant.

Since the primary control valve can satisfactorily control the volume flow under the aforementioned conditions, it is desirable from the standpoint of volume flow to maintain the secondary control valve 18 closed. Therefore, the secondary flow controller 126 must be kept from controlling the operation of the secondary control valve 18 during normal operations under these flight conditions. However, under these same flight conditions, it is desirable to maintain the temperature of the air delivered to a pressurized cabin above a predetermined minimum to prevent icing of the cabin. Therefore, the temperature sensor 114 should control the secondary control valve 18 during these flight conditions. Accordingly, temperature control is known as an anti-icing control.

When the aircraft is flying at high altitudes, it is found that even with the primary control valve 20 at full open position, that the volume flow of air to the pressurized cabin through the cooler 14 may drop below a predetermined minimum. Under these conditions it is necessary that the secondary control valve 18 be opened to provide sufficient volume flow of air to the cabin. Therefore, the secondary control valve 18 should be controlled by the secondary flow controller 126 during these conditions.

Even though the anti-icing control and the secondary flow control are normally operated under the above-mentioned different altitude and pressure conditions, it will be evident that, if large changes occur in the system, for example, a sharp drop in pressure within the pressurized cabin, the secondary flow controller 126 must take over at that point regardless of the altitude or temperature.

This type of selective control is accomplished by the selector valve 111, which always selects the lesser of the two control pressures from the anti-icing control and the secondary flow control for operating the secondary control valve 18.

Figure 3:
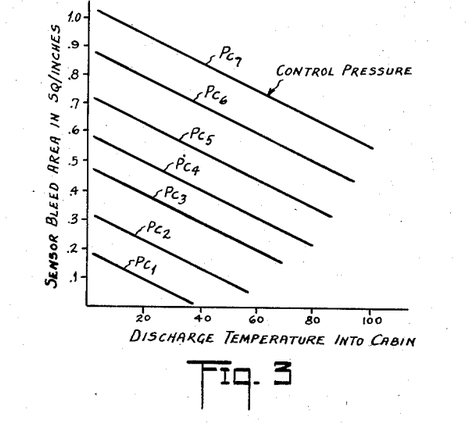
Figure 3 is a series of graphs showing the relation of the temperature sensor bleed areas to the temperatures of air being delivered to the cabin, for various values of control pressures, in accordance with the invention.

Let us first consider the operation of the anti-icing control. Fig. 3 shows a series of curves representing the control pressures that are present in the pipe 112 for given bleed areas of the temperature sensor 114 and temperatures of the air within the output pipe 12.

With changes in the temperature of the air entering the cabin from the output pipe 12 resulting, for example, from a change in the temperature at the air source, the temperature sensor 114 creates a pressure signal by a change in the rate of bleeding of the air from the pipe 112.

If, for example, the temperature of the air in the output pipe 12 becomes colder, more air is bled from the pipe 112 and the pressure in the pipes 109 and 112 drops because of the restriction 110. This drop in pressure is communicated to the secondary control valve 18 through the chambers 142 and 143 of the selector valve 111 and the pipes 155 and 81 to the operating chamber 72 of the secondary control valve 18. In responding to this drop in pressure, the secondary control valve 18 opens further to permit a greater portion of the air discharged from the heat exchanger 11 to by-pass the cooler 14, thereby increasing the temperature of the air in the outlet pipe 12.

In the meantime, the lower pressure in the pipe 81 makes itself felt in the load chamber 91 of the reset controller 90, after an appreciable time delay due to the restriction 158 and the volumetric capacity of the load chamber 91, for example, a time delay on the order of 1 minute. This time delay serves to dampen small fluctuations or variations in operating conditions of the system and is a very important factor in increasing the stability of the system. The lower pressure against the diaphragm 96 permits the diaphragms 96 and 99 to rise, thereby further closing the valve 102 and lowering the regulated pressure $Pr$ in the outlet chamber 93 of the reset controller 90 and its associated outlet pipes 109 and 125.

This portion of the cycle continues until the temperature in the outlet pipe 12 reaches its upper predetermined limit when the temperature sensor 114 becomes more closed, the pressure in the pipes 109 and 112 increases and the poppet valve 69 of the secondary control valve 18 moves towards its closed position, thereby causing a greater proportion of the air discharged from the heat exchanger 11 to pass through the cooler 14.

Since the temperature control depends upon the area in the temperature sensor 114 through which air is bled from pipe 112, any change in the supply pressure $P_s$ to the system would produce an error in the pressure signal $Pc$ generated by the temperature sensor 114 in the pipe 109. From Figure 3, it will be seen that for any given control pressure $Pc$ and any given discharge temperature of the air delivered to the cabin there is but one fixed bleed area in the temperature sensor 114 that would provide a sufficient bleed air flow through the sensor 114 to actuate the secondary control valve 18 to a stable point thus providing the necessary or correct flow for anti-icing. Therefore, any rapid or large fluctuations in the control pressure $Pc$ would produce a change in the amount of secondary air flow by-passing the cooler 14 and in the discharge conditions of the cooler 14. The sensor 114, in attempting to compensate for these changes, would cycle and assume a new stable control pressure except for the reset or integrating action of the reset controller 90.

The reset regulator 90 reaches a state of stability when the sum of the forces on the upper sides of the flexible diaphragms 96 and 99 equals the sum of the forces on the underside of the flexible diaphragms 96 and 99 plus the force on the underside of the poppet valve 102. It will be obvious to those skilled in the art that the force from back pressure on the upper side of the poppet valve 102 can be ignored, if the poppet valve 102 is in the form of a conventional balanced valve, wherein an equal and opposite force is applied to a diaphragm connected to the bottom of the valve by fluid at a pressure equal to the back pressure. The balancing diaphragm in such a valve is designed to have the same effective area as the upper side of the poppet valve.

Equal and opposite pressures will be exerted upon the underside of the diaphragm 96 and the upper side of the diaphragm 99 by the fluid pressure in the reference chamber 92. The downward pressure upon the upper side of the diaphragm 96 will be equal to the control pressure $Pc$ plus the downward biasing pressure of the spring 98. The upward pressure upon the underside of the diaphragm 99 will be equal to the regulated pressure $Pr$.

Thus the reset controller 90 is in a state of stability only when $Pr:Pc = A_1$ (the effective area of the flexible diaphragm 96):$A_2$ (the effective area of the flexible diaphragm 99). Since $A_1$ and $A_2$ are fixed, $Pr/Pc = K$ (a constant). Further, since restriction 110 is fixed and since the control pressure $Pc$ is a function of $Pr$ and the variable bleeder restriction of the sensor 114, the reset controller 90 can be in a stable condition only when the temperature of the air in the output pipe is a predetermined value.

In practice, it has been found that one preferred ratio for $A_1$ to $A_2$ is 1.0 to 0.7. Thus $Pr/Pc = 1.47$.

The temperature control part of the system thus utilizes both proportional and reset actions for stability and utilizes a single control point operation as a pressure signal.

Let us now assume that the volume flow through the system begins to fall below a predetermined minimum. For example, this drop might be caused by changing the cabin from a pressurized condition to an open condition. The selector valve 111 operates to place the secondary control valve 18 under the control of the secondary flow controller 126. The secondary flow controller 126 comprises a variable inlet restriction for the regulated pressure signal $Pr$ and a variable bleeder restriction. A control pressure $Pc$ is then developed, which is a function of the proportionality of the areas of the variable restrictions and the regulated pressure $Pr$. As with the primary flow controller 39, the size of the inlet restriction formed by orifice 130 and valve plate end 135 and the bleeder restriction formed by the orifice 132 and the valve plate end 136 are controlled by the volume flow sensor. Thus the volume flow is proportional to $Pr/Pc$. When the control pressure $Pc$ drops, the secondary control valve 18 opens and increases the volume flow through the system.

Further, since the secondary flow controller 126 is in the same cooperative relation with the reset controller 90 as the temperature sensor control, the ratio $Pr/Pc$ is maintained substantially equal to a predetermined constant determined by the ratio of the effective areas of the flexible diaphragms 96 and 99. Therefore, the secondary controller functions to maintain a substantially constant volume flow through the system.

The selector valve 111 is a necessary element in this embodiment of the present invention, as the system must of itself correctly determine whether the secondary control valve 18 shall be controlled in its physical movements as a secondary flow device under the control pressure $Pc$ of the secondary flow controller 126 or under the control pressure $Pc$ from the anti-icing control. As each of these pressures must be capable of controlling the secondary control valve 18 and as both pressures must not be permitted to attempt to control valve 18 at the same time, the effect of the two pressures must be isolated from each other. The selector valve 111 operates to determine which of the two pressures is the pressure that will allow the secondary control valve 18 to be in its more open position. In practice, the more open position has been found to be the more desired position, whether the secondary control valve 18 is being used as a secondary flow control valve or an anti-icing control valve. The selector valve 111 must, therefore, apply the lower of the two pressures in the pipes 109 and 128, respectively, to the pipes 81 and 156.

If the effect of the sensor 114 is eliminated by manually closing the variable restriction 121 in the pipe 112, the pressure in the pipe 112 builds up at the selector valve chamber 142 to the regulated pressure $Pr$ of the reset controller 90. The selector valve 111 then operates to permit the pressure in the pipe 128 to control the secondary control valve 18 and regulate the outlet pressure $Pr$ of the reset controller 90. The outlet pressure is then governed by the secondary flow controller 126.

Likewise, the variable restriction 160 may be closed. This will stop any bleeding of the air through the pipe 131 from the chamber 129 of the secondary flow controller 126. The pressure in the pipe 128 will then rise to the regulated pressure $Pr$ of the outlet chamber 93 of the reset controller 90. The selector valve 111 will shift the control of the secondary control valve 18 to the temperature sensor controlled pressure in the pipes 109 and 156, since the selector valve 111 permits only the lesser of the pressures in the pipes 109 and 115 to control the secondary control valve 18.

It has been seen that the reset controller reaches a state of pressure stability when the sum of the forces on the upper side of the diaphragms 96 and 99 equals the sum of the forces on the undersides of the diaphragms 96 and 99 plus the force on the underside of the poppet valve 102. This state of stability will continue, however, only so long as the pressure in the output pipe 12 remains constant. However, should the cabin be shifted from a pressurized condition to an open condition, a drop in the pressure in the outlet pipe 12 and an increased drop of pressure across the secondary control valve 18 will be created and the control valve 18 will open wider, thereby causing more air to by-pass the cooler 14. The temperature of the air to the cabin will therefore change.

The use of the reference chamber 92 of the reset controller 90, with its diaphragms 96 and 99 of different effective areas and its pipe 159 leading to the output pipe 12 compensates for changes in pressurized conditions of the cabin. It has been found that the ratio of the effective area of the diaphragm 96 to that of the diaphragm 99 of 1.0 to 0.7 is sufficient, with the connection of pipe 159, to compensate for the change in the drop in pressure across the secondary control valve 18 when the cabin is opened to the atmosphere from a pressurized condition.

In the stabilized condition of the reset controller 90, since the underside of the diaphragm 96 and the upper side of the diaphragm 99, which have different effective areas, are subjected to the pressure of the air in the output pipe 12, a differential force is placed on the rod 104 in a direction to close the valve 102. When the pressure in the outlet pipe 12 is reduced by opening the cabin to the atmosphere, the pressure in the chamber 92 is also reduced. Not only are the individual forces creating the said differential force reduced in actual measurable values, but the overall effect of the change in pressure in the reference chamber 92 is the same as creating another force in the direction of the smaller effective area diaphragm 99. Thus the valve 102 is caused to open wider, raising the reset controller output pressure and furnishing a higher operating pressure on the diaphragm 78 of the secondary control valve 18, thereby compensating for the increase in the drop of pressure across the secondary control valve 18.

Figure 4:
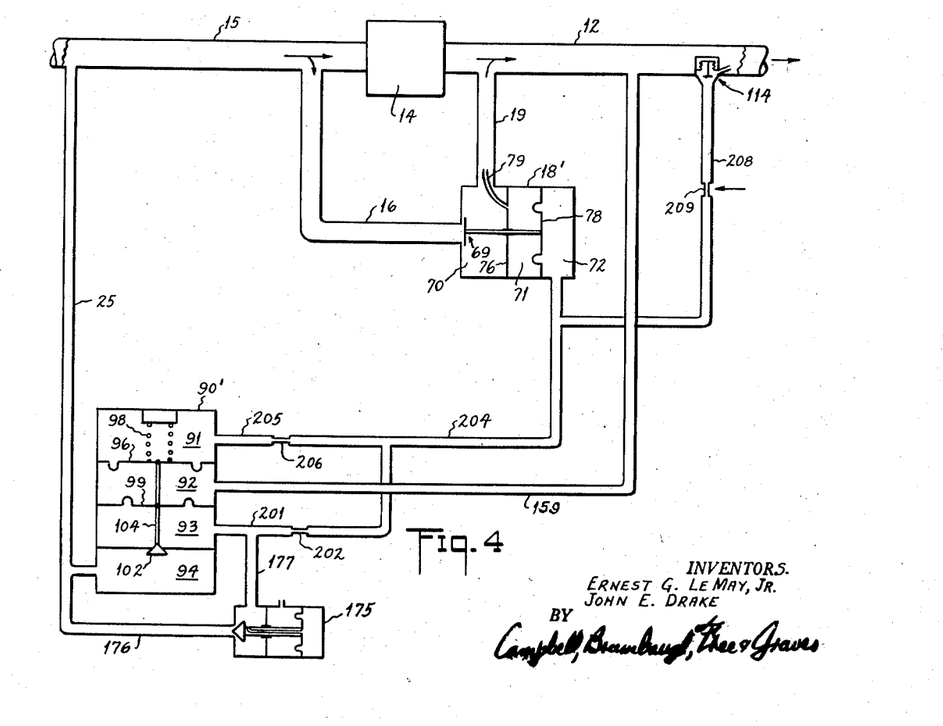
Figure 4 is a schematic diagram of a simplified embodiment of an air conditioning system, in accordance with the invention.

Referring now to Fig. 4, there is shown an alternate form of air conditioning control system, in accordance with the invention which differs from the system of Fig. 1, principally in that heat exchanger 11, the secondary flow controller 126 and the selector valve 111 thereof have been eliminated.

Similar to the arrangement shown in Fig. 1, the by-pass pipe 16 in Fig. 4 leads from the pipe 15 to a secondary control valve 18' and then through the pipe 19 back to the output pipe 12, thereby by-passing the cooler 14. The secondary control valve 18' may be identical with the secondary control valve 18 shown in Fig. 1 or, as shown in Fig. 4, the dash pot 80 which provided the high frequency stabilization of the poppet valve 69 in the arrangement of Fig. 1 may be eliminated under suitable circumstances.

The reset controller 90' may be substantially identical to the reset controller 90 of Fig. 1 except that the connecting pipes may differ in the following manner: The lead-off pipe 25 may be either connected to the input pipe 20, as shown in Fig. 1, or to pipe 15, as shown in Fig. 4.

The output chamber 93 of the reset controller 90' may be connected to the operating chamber 72 of the secondary control valve 18' by means of a pipe 201, having a conventional fixed restriction 202 therein, and a pipe 204. The load chamber 91 may likewise be connected to the operating chamber 72 by means of a pipe 205, which also may have a conventional fixed restriction 206 therein, and the pipe 204. The temperature sensor valve 114 may be connected to the operating chamber 72 of the secondary control valve 18' by means of a pipe 208, coupled to the pipe 204 and having a conventional variable restriction 209 therein. The reference chamber 92 may be directly connected by the pipe 149 to the output pipe 12 in substantially the same manner as shown in Fig. 1.

The start-up valve assembly 175 may be bridged across the reset controller 90' by connecting its input pipe 176 to the lead-off pipe 25 and its output pipe 177 to the pipe 201 upstream of the fixed restriction 202.

The primary control valve 20 and its associated controlling mechanisms, not shown in Fig. 4, may be utilized in cooperation with the embodiment of Fig. 4, in substantially the same manner as in the system of Fig. 1.

In operation, the system of Fig. 4 functions in a manner very similar to that of Fig. 1. The reset controller 90' receives its supply pressure from the pipe 15, or the pipe 10 (Fig. 1), which is connected to the upstream side of the cooler 14. The output from the output chamber 93 of the reset regulator 90' is delivered as a regulated pressure through the fixed restriction 202 to the variable bleeder restriction of the temperature sensor 114 and the control pressure developed in the pipe 204 is fed directly to operating chamber 72 of the secondary control valve 18'. This control pressure is also delivered directly to the load chamber 91 of the reset controller 90' through the pipe 205 and its associated restriction 206.

Thus the reset controller 90', the control restriction 202 and the temperature sensor 114 combine to provide an anti-icing control pressure to the secondary control valve 18' for controlling the proportion of air by-passed around the cooler 14, so as to maintain the temperature of the air in output pipe 12 substantially constant.

As has been explained with reference to the system of Fig. 1, the combination of the reset controller 90' with its reference pressure chamber 92, including the diaphragms 96 and 99, connected to the output pipe 12 and its load chamber 91 connected to the pipe 204 through the restriction 206, minimizes or compensates for the increase in pressure drop across the secondary control valve 18' when the cabin is changed from a pressurized to an open condition.

Thus there had been provided novel and improved air conditioning control systems which produce a highly efficient control of the air conditioning available for use in systems operating under extreme changes in ambient pressure and temperature, for example, in the air conditioning of the pressurized cabins of jet aircraft.

It will be obvious to those skilled in the art that the above-disclosed embodiments are meant to be merely exemplary and that they are susceptible of modification and variation without departing from the spirit and scope of the invention. For example, although the invention has been described in relation to an air conditioning system for aircraft, especially jet aircraft, the system will be equally applicable to other aircraft and to other industrial uses, wherein an air compressor can be utilized to supply air to the system. Further, the system may be used to control other hydraulic systems, wherein a fluid other than air is employed.

In relation to the specific apparatus disclosed, it will be obvious that separate volume sensors could be used with the primary and secondary flow controllers 39 and 126. Also the fixed restrictions 158 and 206 may be actually enclosed within the load chamber 91, so as to make the time constant uniform when the system is operated at high temperatures. Therefore, the invention is not deemed to be limited except as set forth by the appended claims.

We claim:

1. In a system for conditioning fluid from a source subject to variations in pressure, the combination of means responsive to the pressure of the fluid supplied from the source for creating a regulated fluid pressure, fluid restrictive means responsive to a physical condition of the fluid through said system and to said regulated pressure to create a control pressure, and means responsive to said control pressure for controlling said physical condition of said system fluid and for varying said regulated pressure.

2. In a system for conditioning fluid from a source subject to variations in pressure, the combination of means responsive to the pressure of the fluid supplied from the source for creating a regulated fluid pressure, fluid restrictive means responsive to a physical condition of the fluid through said system and to said regulated pressure to create a control pressure, means responsive to said control pressure for controlling said physical condition of said system fluid, and reset means responsive to said control pressure and said regulated pressure for varying said regulated pressure.

3. In a system for conditioning fluid from a source subject to variations in pressure, the combination of means responsive to the pressure of the fluid supplied from the source for creating a regulated fluid pressure, fluid restrictive means responsive to a physical condition of the fluid through said system and to said regulated pressure to create a control pressure, means responsive to said control pressure for controlling said physical condition of said system fluid, and means responsive to said control pressure for maintaining the values of said regulated pressure and said control pressure in a predetermined proportion.

4. In a system for conditioning fluid from a source subject to variations in pressure, the combination of means responsive to the pressure of the fluid supplied from the source for creating a regulated fluid pressure, fluid restrictive means responsive to the volume flow of fluid through said system and to said regulated pressure to create a control pressure, and means responsive to said control pressure for controlling the volume flow of fluid through said system and for varying said regulated pressure.

5. In a system for conditioning fluid from a source subject to variations in pressure, the combination of means responsive to the pressure of the fluid supplied from the source for creating a regulated fluid pressure, fluid restrictive means responsive to the temperature of the fluid in said system and to said regulated pressure to create a control pressure, and means responsive to said control pressure for controlling the temperature of the fluid in said system and for varying said regulated pressure.

6. In a system for conditioning fluid from a source subject to variations in pressure, the combination of means responsive to the pressure of the fluid supplied from the source for creating a regulated fluid pressure, fluid restrictive means responsive to the volume flow of fluid through said system and to said regulated pressure to create a control pressure, means responsive to said control pressure for controlling the volume flow of fluid through said system, and means responsive to said control pressure for maintaining the values of said regulated pressure and said control pressure in a predetermined proportion thereby maintaining said volume flow of fluid through said system substantially constant.

7. In a fluid conditioning system, the combination of a source of regulated fluid pressure, fluid restrictive means responsive to the temperature of the fluid in said system and to said regulated pressure to create a control pressure, means responsive to said control pressure for controlling the temperature of the fluid in said system and means responsive to said control pressure for maintaining the values of said regulated pressure and said control pressure in a predetermined proportion, thereby maintaining said temperature of said system fluid substantially constant.

8. In a fluid conditioning system, the combination of a source of regulated fluid pressure, first fluid restrictive means responsive to one physical condition of the fluid through said system and to said regulated pressure for creating a first control pressure, second fluid restrictive means responsive to another physical condition of the fluid through said system and to said regulated pressure for creating a second control pressure, means for varying the physical conditions of the system fluid in response to a control pressure, means for selecting one of said first and second control pressures to control said fluid condition varying means, and means responsive to said selected control pressure for maintaining the values of said selected control pressure and said regulated pressure in a predetermined proportion.

9. In an air conditioning system comprising a source of compressed air subject to variations in pressure connected to an input channel and an output channel connected to said input channel through two parallel channels, one of said parallel channels including a cooling means and the other of said parallel channels serving as a by-pass channel, the combination of a control valve in said by-pass channel, means responsive to the pressure of the air in said input channel for creating a regulated pressure, and restrictive means responsive to a physical condition of the air in said system and to said regulated pressure for creating a control pressure, means responsive to said control pressure for controlling said by-pass control valve and said regulated pressure to maintain said physical condition substantially constant.

10. In an air conditioning system comprising a source of compressed air subject to variations in pressure connected to an input channel and an output channel connected to said input channel through two parallel channels, one of said parallel channels including a cooling means and the other of said parallel channels serving as a by-pass channel, the combination of a control valve in said by-pass channel, means responsive to the pressure of the air in said input channel for creating a regulated pressure, variable restrictive means responsive to said regulated pressure for creating a control pressure, and means responsive to the temperature of the air in said output channel for varying said restrictive means, means responsive to said control pressure for controlling said by-pass control valve and said regulated pressure to maintain the temperature of the air in said output channel above a predetermined minimum.

11. In an air conditioning system comprising a source of compressed air subject to variations in pressure connected to an input channel and an output channel connected to said input channel through two parallel channels, one of said parallel channels including a cooling means and the other of said parallel channels serving as a by-pass channel, the combination of a control valve in said by-pass channel, means responsive to the pressure of the air in said input channel for creating a regulated pressure, variable restrictive means responsive to said regulated pressure for creating a control pressure, and means responsive to the volume flow of the air in said input channel for varying said restrictive means, means responsive to said control pressure for controlling said by-pass control valve and said regulated pressure to maintain the volume flow of the air in said input channel substantially at a predetermined value.

12. In an air conditioning system comprising a source of compressed air connected to an input channel and an output channel connected to said input channel through two parallel channels, one of said parallel channels including a cooling means and the other of said parallel channels serving as a by-pass channel, the combination of a pressure responsive control valve in said by-pass channel, means responsive to the pressure of the air in said input channel for creating a regulated pressure, variable restrictive means responsive to said regulated pressure for creating a control pressure for said by-pass channel control valve, means responsive to the temperature of the air in said output channel for varying said restrictive means, and means responsive to said control pressure for maintaining the ratio of said regulated pressure to said control pressure at a substantially constant value so as to maintain the temperature of the air in said output channel substantially constant.

13. In an air conditioning system comprising a source of compressed air connected to an input channel and an output channel connected to said input channel through two parallel channels, one of said parallel channels including a cooling means and the other of said parallel channels serving as a by-pass channel, the combination of a pressure responsive control valve in said by-pass channel, means responsive to the pressure of the air in said input channel for creating a regulated pressure, variable restrictive means responsive to said regulated pressure for creating a control pressure for said by-pass channel control valve, means responsive to the volume flow of the air in said input channel for varying said restrictive means, and means responsive to said control pressure for maintaining the ratio of said regulated pressure to said control pressure at a substantially constant value so as to maintain the volume flow of air in said input channel substantially constant.

14. In an air conditioning system comprising a source of compressed air connected to an input channel and an output channel connected to said input channel through two parallel channels, one of said parallel channels including a cooling means and the other of said parallel channels serving as a by-pass channel, the combination of a pressure responsive control valve in said by-pass channel, means responsive to the pressure of the air in said input channel for creating a regulated pressure, first variable restrictive means responsive to said regulated pressure for creating a first control pressure, means responsive to the temperature of the air in said output channel for varying said first restrictive means to modify said first control pressure, second variable restrictive means responsive to said regulated pressure for creating a second control pressure, means responsive to the volume flow of the air in said input channel for varying said second restrictive means to modify said second control pressure, pressure responsive selector valve means for selecting one of said first and second pressures for controlling said control valve in said by-pass channel, and differential means responsive to said selected control pressure and said regulated pressure for controlling the value of said regulated pressure so that the ratio of said selected control pressure and said regulated pressure is maintained substantially constant.

15. An air conditioning system as described in claim 14, wherein said selector valve means selects the one of said first and second control pressures having the least value.

16. An air conditioning system as described in claim 14, including a control valve in said input channel, variable restrictive means having a variable input restriction, a variable exhaust restriction for exhausting said restrictive means and means connecting said input channel to said variable input restriction, means responsive to the volume flow of air in the input channel for controlling the proportionality of the areas of said variable input restriction and said variable exhaust restriction, and differential pressure means responsive to the pressure of the air in said input channel and to the pressure of the air in said variable restrictive means for controlling the position of said control valve so as to control the volume flow of the air in said input channel in cooperation with said by-pass channel control valve.

17. Regulating apparatus for a fluid conditioning system wherein fluid is transmitted through a channel, comprising pressure regulating means responsive to the fluid pressure within said channel for producing a regulated pressure output, means for producing a control pressure including a fixed restriction in communication with the output of said pressure regulating means and a variable bleed restriction, means responsive to a condition of the fluid in said channel for controlling the size of said variable bleed restriction so as to vary said control pressure as a function of said condition of said fluid in said channel, means responsive to said control pressure for controlling the temperature of said fluid, and differential means for maintaining the ratio of said regulated pressure to said control pressure substantially constant.

18. Regulating apparatus for a fluid conditioning system wherein fluid is transmitted through a channel, comprising pressure regulating means responsive to the fluid pressure within said channel for producing a regulated pressure output, means for producing a control pressure including a variable input restriction in communication with the output of said pressure regulating means and a variable bleed restriction, means responsive to a condition of the fluid in said channel for controlling the proportionality of the sizes of said variable input restriction and said variable bleed restriction thereby varying said control pressure as a function of said condition, means responsive to said control pressure for controlling said condition of said fluid in said channel, and differential means for maintaining the ratio of said regulated pressure to said control pressure substantially constant.

19. In a fluid conditioning system having a source of fluid pressure connected to an input channel, an output channel, and a control valve intermediate said input channel and said output channel for controlling the flow of fluid therebetween, the combination of means for supplying fluid at a pressure responsive to the pressure in said input channel, a variable restrictive means having a variable input restriction, a variable exhaust restriction for exhausting said restrictive means, and means connecting said supply means to said variable input restriction, means responsive to the volume flow of fluid in said input channel for controlling the proportionality of the areas of said variable input restriction and said variable exhaust restriction, and means responsive to the pressure of the fluid in said variable restrictive means for controlling the position of said control valve.

20. In a fluid conditioning system having a source of fluid pressure connected to an input channel, and output channel, and a control valve intermediate said input channel and said output channel for controlling the flow of fluid therebetween, the combination of means for supplying fluid at a pressure responsive to the pressure in said input channel, variable restrictive means having a variable input restriction, a variable exhaust restriction for exhausting said restrictive means and means connecting said supply means to said variable input restriction, means responsive to the volume flow of fluid in said input channel for controlling the proportionality of the areas of said variable input restriction and said variable exhaust restriction, and differential pressure means responsive to the pressure of the fluid in said input channel and to the pressure of the fluid in said variable restrictive means for controlling the position of said control valve.

21. In a fluid conditioning system having a source of fluid pressure connected to an input channel, an output channel, and a control valve intermediate said input channel and said output channel for controlling the flow of fluid therebetween, the combination of variable restrictive means having a variable input restriction, a variable exhaust restriction for exhausting said restrictive means, and means connecting said input means to said variable input restriction, means responsive to the volume flow of fluid in the input channel for controlling the proportionality of the areas of said variable input restriction and said variable exhaust restriction, and differential pressure means responsive to the pressure of the fluid in said input channel and to the pressure of the fluid in said variable restrictive means for controlling the position of said control valve.

22. In a fluid conditioning system having a source of fluid pressure connected to an input channel, an output channel, and a control valve intermediate said input channel and said output channel for controlling the flow of fluid therebetween, the combination of variable restrictive means having a variable input restriction, a variable exhaust restriction for exhausting said restrictive means, and means connecting said input means to said variable input restriction, means responsive to the volume flow of fluid in the input channel for controlling the proportionality of the areas of said variable input restriction and said variable exhaust restriction, and differential pressure means responsive to the pressure of the fluid in said input channel and to the pressure of the fluid in said variable restrictive means for controlling the position of said control valve as a function of a predetermined proportionality between the pressures of the fluid in said input channel and the fluid in said variable restrictive means.

23. In a fluid conditioning system having a source of fluid pressure connected to an input channel, an output channel, and a control valve intermediate said input channel and said output channel for controlling the flow of fluid therebetween, the combination of variable restrictive means having a variable input restriction, a variable exhaust restriction for exhausting said restrictive means, and means connecting said input means to said variable input restriction, means responsive to the volume flow of fluid in the input channel for controlling the proportionality of the areas of said variable input restriction and said variable exhaust restriction, and differential pressure means responsive to the pressure of the fluid in said input channel, the pressure of the fluid in said variable restrictive means, and the ambient pressure of the fluid in which the system is located for controlling the position of said control valve as a function of a predetermined proportionality of the pressures of the fluid in said input channel, the fluid in said variable restrictive means and said ambient pressure.

24. In an air conditioning system having a source of compressed air connected to an input channel, an output channel, and a control valve intermediate said input channel and said output channel for controlling the flow of air therebetween, the combination of variable restrictive means having a variable input restriction, and variable exhaust restriction for exhausting said restrictive means, and means connecting said input channel to said variable input restriction, means responsive to the volume flow of air in said input channel for controlling the proportionality of the areas of said variable input restriction and said variable exhaust restriction, and differential pressure responsive actuating means for controlling the position of said control valve including a first chamber connected to said input channel, a second chamber connected to said variable restrictive means, a third chamber positioned intermediate said first and second chambers and separated therefrom respectively by flexible diaphragms of different effective areas, said third chamber being open to the atmosphere, and means fixedly connected to said diaphragms and movable therewith for positioning said control valve.

References Cited in the file of this patent

UNITED STATES PATENTS

| | | |
|---|---|---|
| 1,763,666 | Machlet | June 17, 1930 |
| 1,813,401 | Helmstaedter | July 7, 1931 |
| 1,988,348 | Annin | Jan. 15, 1935 |
| 2,117,800 | Harrison | May 17, 1938 |
| 2,264,511 | Dickey | Dec. 2, 1941 |
| 2,311,848 | Luhrs | Feb. 23, 1943 |
| 2,425,000 | Paget | Aug. 5, 1947 |
| 2,519,475 | Kennedy et al. | Aug. 22, 1950 |
| 2,644,641 | Clarkson | July 7, 1953 |

FOREIGN PATENTS

| | | |
|---|---|---|
| 696,712 | Great Britain | Sept. 9, 1953 |